United States Patent [19]
Rüggen et al.

[11] 3,747,366
[45] July 24, 1973

[54] FLEXIBLE COUPLING HAVING FRICTION-INCREASING MEANS

[75] Inventors: Werner Rüggen, Holzwickede; Herbert Krellmann; Helmut Bache, both of Unna, all of Germany

[73] Assignee: Maschinenfabrik Stromag G.m.b.H., Unna, Germany

[22] Filed: Apr. 24, 1972

[21] Appl. No.: 247,219

Related U.S. Application Data

[63] Continuation of Ser. No. 69,581, Sept. 4, 1970, abandoned.

[30] Foreign Application Priority Data

Sept. 15, 1969 Germany.................. P 19 46 600.3

[52] U.S. Cl.................. 64/11, 64/27 NM, 287/127
[51] Int. Cl.............................................. F16d 3/19
[58] Field of Search.................. 64/11, 13, 27 NM, 64/27 F, 30 D; 287/127, 130, 20.3

[56] References Cited
UNITED STATES PATENTS

| | | | |
|---|---|---|---|
| 2,186,305 | 1/1948 | Orr | 64/11 R |
| 2,901,897 | 9/1959 | Reich | 64/13 |
| 2,617,672 | 11/1952 | Nichols | 287/20.3 |
| 3,604,045 | 9/1971 | Smith | 64/30 D |

Primary Examiner—Charles J. Myhre
Assistant Examiner—Randall Heald
Attorney—Erwin Salzer

[57] ABSTRACT

A flexible coupling including a pair of juxtaposed coupling members and a flexible torque-transmitting member for transmitting torques from one of said pair of coupling members to the other is provided with intermediate auxiliary torque-transmitting layers having a high coefficient of friction to increase the strength of the frictional engagement of cooperating parts of the coupling. The above layers are formed by spray deposits of metal particles.

2 Claims, 1 Drawing Figure

PATENTED JUL 24 1973 3,747,366
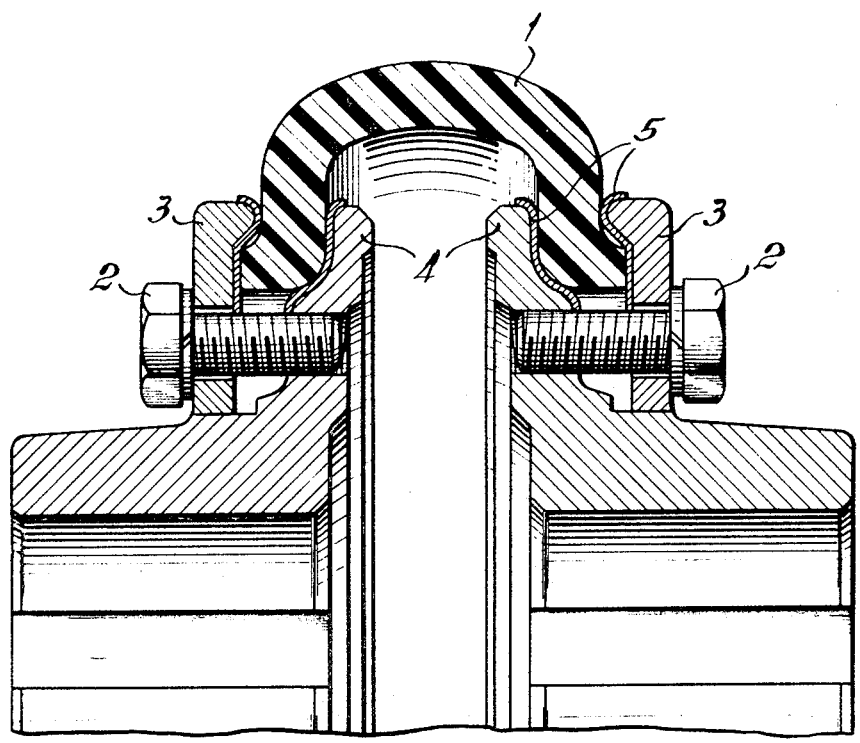
INVENTORS:
Werner RÜGGEN
Herbert KRELLMANN
Helmut BACHE
BY
their ATTORNEY

FLEXIBLE COUPLING HAVING FRICTION-INCREASING MEANS

The present application is a continuation of patent application Ser. No. 69,581 filed on Sept. 4, 1970, now abandoned.

BACKGROUND OF THE INVENTION

This invention refers to flexible couplings including a pair of juxtaposed coupling members, a flexible torque-transmitting member for transmitting torques from one of said pair of coupling members to the other, and a pair of clamping means for clamping portions of said torque-transmitting member against each of said pair of coupling members.

In such couplings the magnitude of the torque which can be transmitted from one of the pair of coupling members to the other depends upon the radius of the points where the torque-transmitting member is being clamped against the pair of coupling members, the degree of pressure exerted by the pair of clamping means against the torque-transmitting member, and upon the coefficient of friction of the materials of the engaging surfaces of the above referred-to parts.

Some prior art couplings are provided with knurls, or the like projections, or the surfaces thereof which engage under pressure the flexible torque-transmitting member. Friction-increasing means of this nature cannot readily be adopted in instances involving non-planar clamping surfaces whose shape or geometry is relatively complex.

Other prior art flexible couplings have clamping surfaces which are roughened by sandblasting. The method of increasing the co-efficient of friction can be applied irrespective of the configuration or geometry of the clamping surfaces of the pair of coupling members and the pair of clamping means as for instance, clamping rings. Sandblasting produces a grainy surface texture having relatively sharp points and edges tending to damage the torque-transmitting member which is generally made of vulcanized rubber at the points of engagement with the latter. Therefore sandblasting is not an acceptable answer to the problem of maximizing the torque-transmitting ability of a flexible coupling.

It is well known that cast iron has a relatively rough internal structure or grain, and in some prior art flexible couplings the parts for clamping the resilient or elastomeric torque-transmitting member were made of cast iron. Such couplings are, however, unsatisfactory because the internal structure, or grain, of cast iron is not sufficiently uniform for the purpose under consideration, and further because the clamping parts of couplings are subjected to bending stresses, and cast iron has a very limited bending strength.

The present invention is concerned with friction-increasing-means on flexible couplings of the above description which are not subject to the limitations of comparable prior art flexible couplings.

SUMMARY OF THE INVENTION

The invention refers more specifically to couplings having non-planar torque-transmitting surfaces on the coupling members and on the clamping members in frictional engagement with the flexible torque-transmitting member. These surfaces support an intermediate torque-transmitting layer or overlay having a high-coefficient of friction maximizing the torque that can be transmitted from one coupling member to the other by the intermediary of the flexible torque-transmitting member. The overlay is formed by deposits of sprayed-on metal.

BRIEF DESCRIPTION OF THE DRAWING

The Drawing illustrates a flexible coupling in vertical axial section and is limited to the upper portion of the coupling, the lower portion of the coupling being identical to its upper portion and being deleted for this reason.

DESCRIPTION OF PREFERRED EMBODIMENT OF THE INVENTION

The drawing shows a pair of coaxial coupling members which define a gap therebetween. Each coupling member is provided with a coupling flange 4. Reference numeral 1 has been applied to indicate a flexible torque-transmitting member which is substantially U-shaped in cross-section and has a pair of flange portions each being arranged within a gap bounded on one side by a flange 4 of one of the pair of coupling members, and on the other side by one of the clamping means or clamping rings 3. Clamping screws 2 project transversely through clamping means 3 into the flange portions 4 of the coupling members. One of the coupling members is intended to be fixedly mounted on a driving shaft and the other of the coupling members is intended to be fixedly mounted on a coaxial driven shaft. Flanges 4 and clamping means or clamping rings 3 include non-planar surfaces having a relatively complex shape which are in abutting engagement with the aforementioned flange portions of torque-transmitting member 1. These surfaces are each provided with an intermediate layer or overlay 5 having a relatively high coefficient of friction. It has been found that such a layer or overlay 5 if formed by a spray deposit of metal particles has an optimal effect. Layers or overlays of sprayed-on metal particles are capable of greatly increasing the co-efficient of friction and are not subject to any of the limitations of the prior art friction-increasing means referred-to above.

We claim:

1. In a flexible coupling including a pair of juxtaposed coupling members each having a non-planar torque-transmitting surface, a flexible torque-transmitting member for transmitting torques from one of said pair of coupling members to the other of said pair of coupling members, and a pair of clamping means each having a non-planar torque-transmitting surface engaging portions of said torque-transmitting member for clamping said portions of said torque-transmitting member against said torque-transmitting surface of each of said pair of coupling members, the novel feature consisting in that said torque-transmitting surface of each of said pair of coupling members is provided with an intermediate torque-transmitting relatively thin integral sprayed-on metal overlay and in that said torque-transmitting surface of each of said pair of clamping means is provided with a relatively thin integral sprayed-on metal overlay.

2. A flexible coupling include a flexible torque-transmitting member substantially U-shaped in cross-section and having a pair of flanges, a pair of coupling members having non-planar clamping surfaces engaging axially inner surface elements of said pair of flanges of said torque-transmitting member, each of said clamping surfaces of said pair of coupling members being provided with a sprayed-on metal deposit, and a pair of clamping members having non-planar clamping surfaces engaging and screwed against axially outer surface elements of said pair of flanges of said torque-transmitting member, each of said clamping surfaces of said pair of clamping members being provided with a sprayed-on metal deposit.

* * * * *